Figure 1:
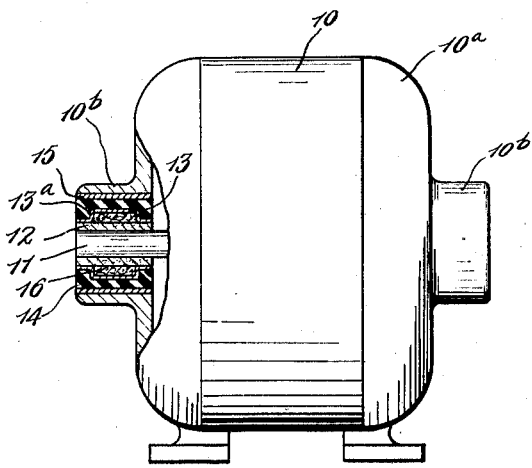

Dec. 3, 1940. J. F. McWHORTER ET AL 2,223,872

SELF-ALIGNING BEARING

Filed Jan. 11, 1940

INVENTORS
JOHN F. McWHORTER
MARION W. HUMPHREYS
BY
Kwis Hudson & Kent
ATTORNEYS

Patented Dec. 3, 1940

2,223,872

UNITED STATES PATENT OFFICE 2,223,872

SELF-ALIGNING BEARING

John F. McWhorter, Willoughby, and Marion W. Humphreys, Euclid, Ohio, assignors to The Ohio Rubber Company, Willoughby, Ohio, a corporation of Ohio Application January 11, 1940, Serial No. 313,414

5 Claims. (Cl. 308—26)

This invention relates to self-aligning bearings adapted particularly for the shafts of motors or other equipment having shafts which are rotated by electrical or other means or which are given a reciprocating or combined reciprocating and rotary movement.

In one of its aspects this invention is an improvement on the constructions disclosed in our prior application Serial No. 269,933, filed April 25, 1939, for Self-aligning bearings.

In our prior application we have shown several forms of self-aligning bearings with special provision for lubrication, said bearings each being in the form of a unit consisting of inner and outer members preferably in the form of concentric sleeves spaced apart by a yieldable medium such as soft or semi-soft elastic artificial rubber or equivalent plastic material which is bonded to the inner surface of the outer sleeve and to the outer surface of the inner sleeve. The bearings of our prior application give very good results but they have one disadvantage, namely, that when the inner bearing member or inner sleeve is formed of porous material to which lubricant is adapted to be supplied and when artificial rubber is used as the plastic between the inner and outer sleeves, the porosity of the inner sleeve is lost or very much reduced by reason of the fact that the pores or at least the pores of the outer portion of the sleeve become filled with rubber when the rubber is molded and vulcanized under pressure to the inner and outer members whether or not a cement is used to increase the adhesion between the rubber and the metal.

The above disadvantage is entirely overcome by the present invention which contemplates a bearing such as proposed in our prior application but with the addition of another sleeve which is the innermost or shaft receiving sleeve secured in concentric relation to the one next to it which is the sleeve to which the yieldable medium is bonded. Thus the rubber or other plastic medium does not come in contact with the innermost sleeve during the bonding operation and this permits the use of an inner shaft receiving sleeve which may be made of porous material without danger of its pores being obstructed. This construction also admits of the provision of a lubricant receiving chamber between the innermost sleeve and the one into which it is secured and to which the yieldable medium is bonded.

The invention may be further briefly summarized as consisting in certain novel details of construction and combinations and arrangements of parts which will be described in the specification and set forth in the appended claims.

Figure 2:
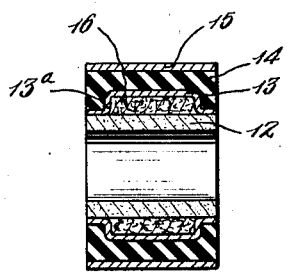

In the accompanying sheet of drawings showing several embodiments of the invention, Fig. 1 is a side view of a motor with parts in section showing one embodiment of our improved self-aligning bearings;

Fig. 2 is a sectional view on a slightly enlarged scale of the bearing of Fig. 1; and Figs. 3, 4, 5, and 6 are views similar to Fig. 2 but showing modifications.

Referring now to the drawing and first to Fig. 1, 10 represents the housing of an electric motor the rotor of which (not shown) is provided with a shaft 11 for which the self-aligning bearings produced in accordance with the present invention are provided. In this instance the end bells 10a of the housing 10 have bearing flanges 10b which receive the self-aligning bearings and in which the bearings are suitably secured as by a pressed fit, as shown at the lefthand side of Fig. 1, it being understood that both bearings will be formed like the bearing shown in section at the left side of Fig. 1. It is not essential that the motor housing have integral bearing flanges in which the self-aligning bearings for the motor shaft are fitted since these bearings may be supported by and secured to the motor housing or equivalent stationary element in other ways as will subsequently appear.

With all forms of the present invention the self-aligning and preferably also self-lubricating bearing is in the form of a unit consisting preferably of four concentric sleeves successively attached one to the other. The bearing shown in Figs. 1 and 2 is composed of the following concentric sleeves, to-wit, an inner metal bearing sleeve 12, an intermediate metal sleeve 13 in which the sleeve 12 is fitted and secured, an intermediate sleeve 14 of suitable yieldable or elastic material which surrounds and is secured to the sleeve 13, and an outer sleeve 15 to which the sleeve 14 of yieldable material is secured.

Although in the broader aspect of the invention the inner sleeve 12 may be formed of solid metal, such as bronze which is a well recognized bearing material, it is preferably formed of porous bearing material such as is commonly made from molded and sintered finely divided bearing materials. The intermediate ring 13 and the outer ring 15 are preferably formed from solid metal such as sheet or tubular steel. The yieldable or elastic sleeve 14 is preferably formed from a plastic substantially inert to oil, artificial rubber being preferably employed for this purpose. It is molded and vulcanized in contact with and bonded with or without the use of a cement to the inner surface of the outer sleeve 15 and to the outer surface of the intermediate sleeve 13, and, when vulcanized, it is in soft or semi-soft elastic state so as to normally hold the inner sleeve 12 and intermediate sleeve 13 concentric with the outer sleeve but is capable of yielding to accommodate inaccuracies in the shaft alignment. We prefer to use artificial rubber rather than natural rubber since the artificial rubber is substantially unaffected by oil or other hydrocarbons. Likewise, the artificial rubber suffers less deterioration than natural rubber under the action of heat and otherwise has longer life. The artificial rubber that we prefer to employ is sold under the trade-name "Neoprene" but other artificial rubber such as "Perbunam," "Thiokol," and "Koroseal," may be employed as well as other suitable plastics which are substantially inert to oil and when cured will be bonded to the two sleeves between which it is located.

The inner shaft receiving sleeve 12 is fitted into and tightly secured to the intermediate sleeve 13 by any suitable means or method, as by welding or brazing or by a forced fit which generally suffices.

Between the inner sleeve 12 and the intermediate sleeve 13 a lubricant receiving chamber is formed in one or both of the sleeves preferably in the surrounding sleeve 13 as illustrated herein wherein the middle portion of the sleeve 13 is offset outwardly with respect to the ends of the sleeve which ends or end portions are flanged from the offset portion radially inwardly and then axially outwardly as shown at 13a, forming at the ends of the sleeve short cylindrical flanges in which the sleeve 12 is tightly fitted or secured. In this manner there is formed between the two sleeves 12 and 13 a lubricant receiving chamber 16 which may be filled with lubricant such as soft grease before the sleeves 12 and 13 are assembled. The sleeve 12, if formed of porous material as is preferred, may be impregnated with lubricant before the parts of the bearing are assembled and as the lubricant is consumed by the rotation of the shaft it will pass from the chamber 16 into the pores of the sleeve 12 so as to keep it in condition for supplying lubricant to the shaft practically throughout the life of the motor.

Thus by the use of two solid metal sleeves with an intermediate sleeve of artificial rubber (or equivalent elastic material) bonded to the two sleeves and by having the porous sleeve which receives the shaft formed separately from the sleeve to which the rubber is bonded, the porous sleeve loses none of its porosity in the bonding operation as is the case if the intermediate sleeve 13 is omitted and the rubber is bonded directly to the porous sleeve. Furthermore, if the porous sleeve is secured in place by being pressed into the sleeve which surrounds it, should the porous sleeve wear to any extent it can be forced out and replaced with a new sleeve. In other words, the only part of the bearing unit which is subjected to wear can be replaced if necessary without discarding the entire bearing.

It is not essential that the bearing unit involving our invention be secured in place by being forced into or otherwise secured in a bearing flange of a motor or equivalent piece of apparatus as will be seen by reference to Figs. 3, 4, 5, and 6. In each of Figs. 3, 4, and 5, we have shown a bearing consisting of an inner shaft receiving sleeve 17 which, as before, may be made of porous bearing material, this sleeve being fitted into a solid metal sleeve 18 to which is bonded a rubber or equivalent plastic sleeve 19 in turn bonded to an outer sleeve 20 also preferably of solid metal, the sleeve 18 having as before a lubricant receiving chamber 21 which may be packed with soft grease or other lubricant. With the bearing units shown in these figures the outer sleeve 20 has a radially extending flange 20a which is adapted to be secured by welding, riveting or otherwise to a housing member 22. In this manner the bearing unit is secured in fixed position with respect to the motor or other apparatus and with respect to the shaft which is adapted to be journaled in the inner sleeve.

Figure 3:
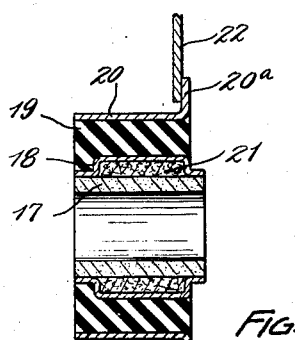
Figure 4:
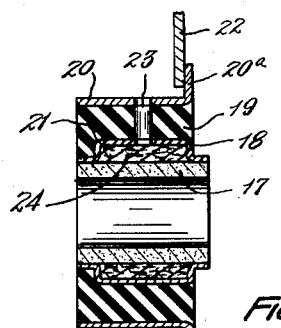

The bearing shown in Fig. 4 differs from that shown in Fig. 3 in the respect that an oil hole 23 is provided through the outer sleeve 20, the yieldable sleeve 19, and the intermediate sleeve 18 so that lubricant may be supplied to the lubricant chamber. In such case the lubricant chamber may be filled with felt or other lubricant absorbing material indicated at 24.

Figure 5:
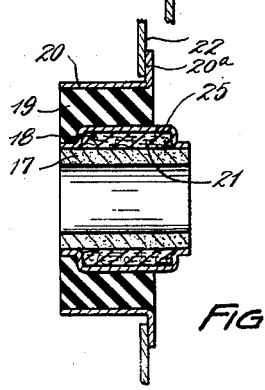

The construction shown in Fig. 5 is similar to that shown in the preceding figures except that the inner sleeves 17 and 18 are offset inwardly with respect to the yieldable sleeve 19 and the outer sleeve 20 and leaving room for an oil hole 25 through the offset part of the sleeve 18 and leading to the lubricant receiving chamber 21. If desired, the chamber may be filled with felt or equivalent lubricant absorbent material as in Fig. 4.

Figure 6:
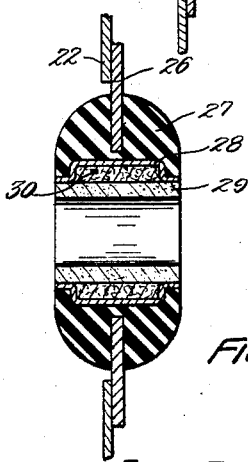

The construction shown in Fig. 6 differs from that shown in the preceding figures in the respect that in place of the outer sleeve 15 of Fig. 2 or the outer sleeve 20 of Figs. 3, 4, and 5, there is substituted a radially disposed metal plate 26 generally in the form of a disk with its inner portion embedded in and bonded to a sleeve or ring 27 of rubber or equivalent yieldable or elastic material. The sleeve or ring 27 in turn surrounds and is bonded to a sleeve 28 corresponding in all respects to the sleeve 13 of Fig. 2 or the sleeve 18 of Figs. 3, 4, and 5, and secured in the sleeve 28 is a bearing sleeve 29 similar to the sleeve 12 of Fig. 2 or the sleeve 17 of Figs. 3, 4, and 5. The solid metal sleeve 28 has an offset portion as before, forming a lubricant receiving chamber 30 which before assembly of the two inner sleeves may be filled with a suitable lubricant. A portion of the plate or disk 26 extends outwardly beyond the rubber sleeve or ring 27 and constitutes a flange by which the bearing unit may be secured by welding, riveting or otherwise to the housing member 22 as is the case with the constructions shown in Figs. 3, 4, and 5.

While we have shown several embodiments of the invention, various other changes may be made without departing from the spirit and scope of the invention, and we therefore aim in our claims to cover all modifications within the scope of the appended claims.

Having thus described our invention, we claim:

1. A self-aligning bearing for shafts in the form of a unit comprising an inner sleeve, an intermediate sleeve into which the inner sleeve is secured, an outer sleeve, and a body of yieldable plastic located between and bonded to the intermediate and outer sleeves.

2. A self-aligning bearing for shafts in the form of a unit comprising an inner sleeve, an intermediate sleeve into which the inner sleeve is secured, an outer sleeve, and a body of yieldable plastic located between and bonded to the intermediate and outer sleeves there being a lubricant receiving chamber between the inner and the intermediate sleeves.

3. A self-aligning bearing for shafts in the form of a unit composed of four substaintially concentric sleeves comprising an inner first sleeve formed of porous metal and adapted to receive a shaft, a second sleeve into which the first sleeve is secured, a third sleeve formed of yieldable plastic, and an outer fourth sleeve, the second and fourth sleeves being formed of solid metal and the yieldable third sleeve being bonded to the outer surface of the second sleeve and to the inner surface of the fourth or outer sleeve.

4. A self-aligning bearing for shafts in the form of a unit composed of four substantially concentric sleeves comprising an inner first sleeve formed of porous metal and adapted to receive a shaft, a second sleeve into which the first sleeve is secured, a third sleeve formed of yieldable plastic, and an outer fourth sleeve, the second and fourth sleeves being formed of solid metal and the yieldable third sleeve being bonded to the outer surface of the second sleeve and to the inner surface of the fourth or outer sleeve, there being a lubricant receiving chamber between portions of the first and second sleeves.

5. A self-aligning bearing for shafts composed of four substantially concentric sleeves fastened together in the form of a unit, the innermost sleeve being porous and formed from molded and sintered finely divided material, two of said sleeves consisting of the outermost and the one next to the innermost being formed of solid non-porous sheet metal, the inner of the two being non-rotatably secured to the inner porous sleeve and the fourth sleeve being formed from yieldable artificial rubber which is located between the two sheet metal sleeves and directly bonded thereto, there being between the porous inner sleeve and the adjacent solid metal sleeve a lubricant receiving chamber formed by offsetting the middle portion of said adjacent metal sleeve with respect to its ends.

JOHN F. McWHORTER.
MARION W. HUMPHREYS.